United States Patent [19]
Zondlo

[11] Patent Number: 5,461,292
[45] Date of Patent: Oct. 24, 1995

[54] REMOTE CONTROLLED GUIDANCE SYSTEM FOR WORKING VEHICLE

[76] Inventor: Robert Zondlo, 70 Bolton Rd., Wayne, N.J. 07470

[21] Appl. No.: 276,309

[22] Filed: Jul. 18, 1994

[51] Int. Cl.$^6$ .............................. G01S 13/02; G05D 1/00
[52] U.S. Cl. .......................... 318/587; 180/169; 364/449
[58] Field of Search ...................................... 318/580, 581, 318/587; 56/17.5; 172/23, 25; 180/167, 168, 169; 340/988, 989; 342/51, 118, 125, 134, 135, 137; 364/424.01, 424.02, 449, 460

[56] References Cited

U.S. PATENT DOCUMENTS

| | | |
|---|---|---|
| 3,808,426 | 4/1974 | Birkin . |
| 3,810,179 | 5/1974 | Merrick . |
| 4,156,873 | 5/1979 | Moore . |
| 4,728,955 | 3/1988 | Hane . |
| 4,878,003 | 10/1989 | Knepper ................................. 318/587 |
| 4,905,009 | 2/1990 | Ulich et al. ............................ 342/118 |
| 5,347,274 | 9/1994 | Hassett .................................. 340/988 |
| 5,387,916 | 2/1995 | Cohn ...................................... 342/44 |

*Primary Examiner*—Bentsu Ro
*Attorney, Agent, or Firm*—Terrance L. Siemens

[57] ABSTRACT

A remote control method of guidance for a work vehicle including a handheld control unit, an antenna/transponder placed on the periphery of the worksite, a controlling unit on the work vehicle itself. The control unit compares timing signals to subsequently control of the speed of independently powered wheels. There is a manual and automatic mode of control for the vehicle. The vehicle is positioned at a starting point by the user, and upon activation of the automatic mode, a timing pulse, either ultrasonic or electromagnetic is issued from the control unit on the vehicle. When the pulse is sensed by the transponder on the antenna, a responding pulse is transmitted. This is, in turn, received by the vehicle and thus a base time is set for the interval between the transmission of the pulse and the return signal from the transponder, the interval being indicative of the distance between them. The vehicle moves forward while continuing at intervals to send the pulse and if the secondary timing interval is larger than the base interval, the inner wheel is slowed to bring the vehicle closer. If the interval is shorter, the inner wheel is speeded up to move the vehicle away from the transponder. Thus, the vehicle describes a smooth arc about the transponder until the user sends another signal to the device, indicating that the device is to move a preset distance further away from the transponder, reset the base interval, and continue.

6 Claims, 4 Drawing Sheets

REMOTE CONTROLLED GUIDANCE SYSTEM FOR WORKING VEHICLE

BACKGROUND OF THE INVENTION

1. Field of the Invention

The present invention relates to guidance systems for remote work vehicles. More specifically, it relates to a method of controlling a remote work vehicle by a timed pulse broadcast to, and then returned by, a stationary antenna/transponder placed at the periphery of the worksite. It should be understood from the outset that the term "remote work vehicles" is not necessarily limited to land traversing vehicles or to vehicles used exclusively for work, and the term "vehicles" is not necessarily limited to wheeled vehicles.

The potential fields of use for this invention range from a simple lawn mower as shown herein, to controlling vehicles for cleaning up toxic waste sites, to interplanetary space or undersea exploration. Other applications for the invention could be on a vacuuming machine, snow thrower, leaf blower, fertilizer spreader, floor waxer, or power screed. Thus it can be seen that the potential fields of use for this invention are myriad and the particular preferred embodiment described herein is in no way meant to limit the use of the invention to the particular field chosen for exposition of the details of the invention.

A comprehensive listing of all the possible fields to which this invention may be applied is limited only by the imagination and is therefore not provided herein. Some of the more obvious applications are mentioned herein in the interest of providing a full and complete disclosure of the unique properties of this previously unknown general purpose article of manufacture. It is to be understood from the outset that the scope of this invention is not limited to these fields or to the specific examples of potential uses presented hereinafter.

2. Description of the Prior Art

In many instances, for safety or efficiency reasons, it is desirable for the working vehicle to be controlled from a remote site. This does not always entail cameras and servos. In a number of environments, the operator of the vehicle is in visual contact with the unit.

Robotic devices for mowing expansive areas are old and well known in the art. Many such devices attempt to operate in a totally automatic fashion without a human in the loop. When such a device encounters an unexpected obstacle or condition disaster usually results. This invention is primarily concerned with providing semi-automatic or operator intervened control. However, the technology developed herein can certainly find application in fully automatic control systems.

The following known prior art has been directed to providing robotic mowing devices. In a search conducted in this field, the following patents were uncovered that relate to the present invention. As will be seen, the simplicity and effectiveness of my invention is not rivaled in the prior art.

U.S. Pat. No. 5,083,629, issued on Jan. 28, 1992, to Chih-Li Chang there is disclosed a walking control mechanism for automatically controlled vehicles. The device senses through a feedback odometer the distance travelled, and at a predetermined point turns on the separately controlled drive wheels to move back and forth across the work area.

U.S. Pat. No. 4,994,970, issued on Feb. 28, 1991, to Akio Noji et al. discloses a working robot that, through a light beam detector, determines its position within a set working area as it proceeds; and when the accumulator is full, through this position detector means is able to navigate its way to a drop off point. By contrast, the device of the instant invention does not use a light beam detector.

Another patent of interest is U.S. Pat. No. 4,944,140, issued to Richard L. Donaghey on Jul. 31, 1990. This discloses a cable guidance system for a self-propelled machine. By contrast the device of the instant invention does not depend in any way on cable guidance.

Lastly, U.S. Pat. No. 4,694,639, issued to Sheng K. Chen et al. on Sep. 27, 1987, there is disclosed a robotic lawn mower that incorporates a paper tape recorder and an optical reader that allows the device, after once being guided through or over a course or yard, to repeat the path without further need for human guidance. By contrast, the device of the instant invention does not depend on the recording of a learning session.

It will be noted that none the prior art devices utilize a human operating a joystick as in the instant invention. Also the specific guidance method of steering by driving is not shown by the prior art.

None of the above inventions and patents, taken either singly or in combination, is seen to describe the instant invention as claimed.

SUMMARY OF THE INVENTION

Briefly, the present invention is a remote control method of guidance for a work vehicle. It includes a handheld control unit, an antenna/transponder placed in a peripheral corner of the worksite, and a controlling unit on the work vehicle itself for the comparison of timing signals and subsequent control of the speed of the independently powered wheels on the device.

There is a manual and automatic mode of control for the vehicle. The vehicle is positioned at a starting point by the user, and upon activation of automatic mode, a timing pulse, either ultrasonic or electronic is issued from the control unit on the vehicle. When the pulse is sensed by the transponder on the antenna, a responding pulse is transmitted. This, in turn, is received by the vehicle and thus a base time is set for the interval between the transmission of the pulse and the return signal from the transponder, the interval being defined by the distance between them. The vehicle moves forward while continuing to send the pulse and, if the timing interval is larger than the base interval, the inner wheel is slowed to bring the vehicle closer. If the interval is shorter, the inner wheel is speeded up to move the vehicle away from the transponder. Thus, the vehicle describes a smooth arc of constant distance from the transponder until the user sends another signal to the device. Such a user sent signal could be on directing the device to move a preset distance further away from the transponder, reset the base interval, and then continue as before.

Accordingly, it is a principle object of the invention to provide a new and improved remote controlled guidance system which overcomes the disadvantages of the prior art in a simple but effective manner.

Accordingly, it is another principle object of the invention to provide a remote guidance system for a work vehicle that allows the device to smoothly cover a desired area without the user being in direct proximity to the vehicle.

It is another object of the invention to provide a remote guidance system for a work vehicle wherein a base timing interval is set at the beginning of each swath path through the area and pulses are transmitted to a transponder and compared to the resulting return signal through the path of the swath for control of the inner wheel of the vehicle, thus providing for a smooth arc about the transponder location.

It is a further object of the invention to provide a remote guidance system for a work vehicle wherein the operations are performed through a handheld, joystick-like control unit.

Still another object of the invention is to allow for a predetermined distance to be set where, at the end of each swath path, the vehicle pivots 90° and moves outward from the transponder before setting another base timing interval and proceeding on a subsequent swath.

It is a major goal of the invention to provide improved elements and arrangements thereof in an apparatus for the purposes described which is inexpensive, dependable and fully effective in accomplishing its intended purposes.

The present invention meets or exceeds all the above objects and goals. Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF A PREFERRED EMBODIMENT

Figure 1:
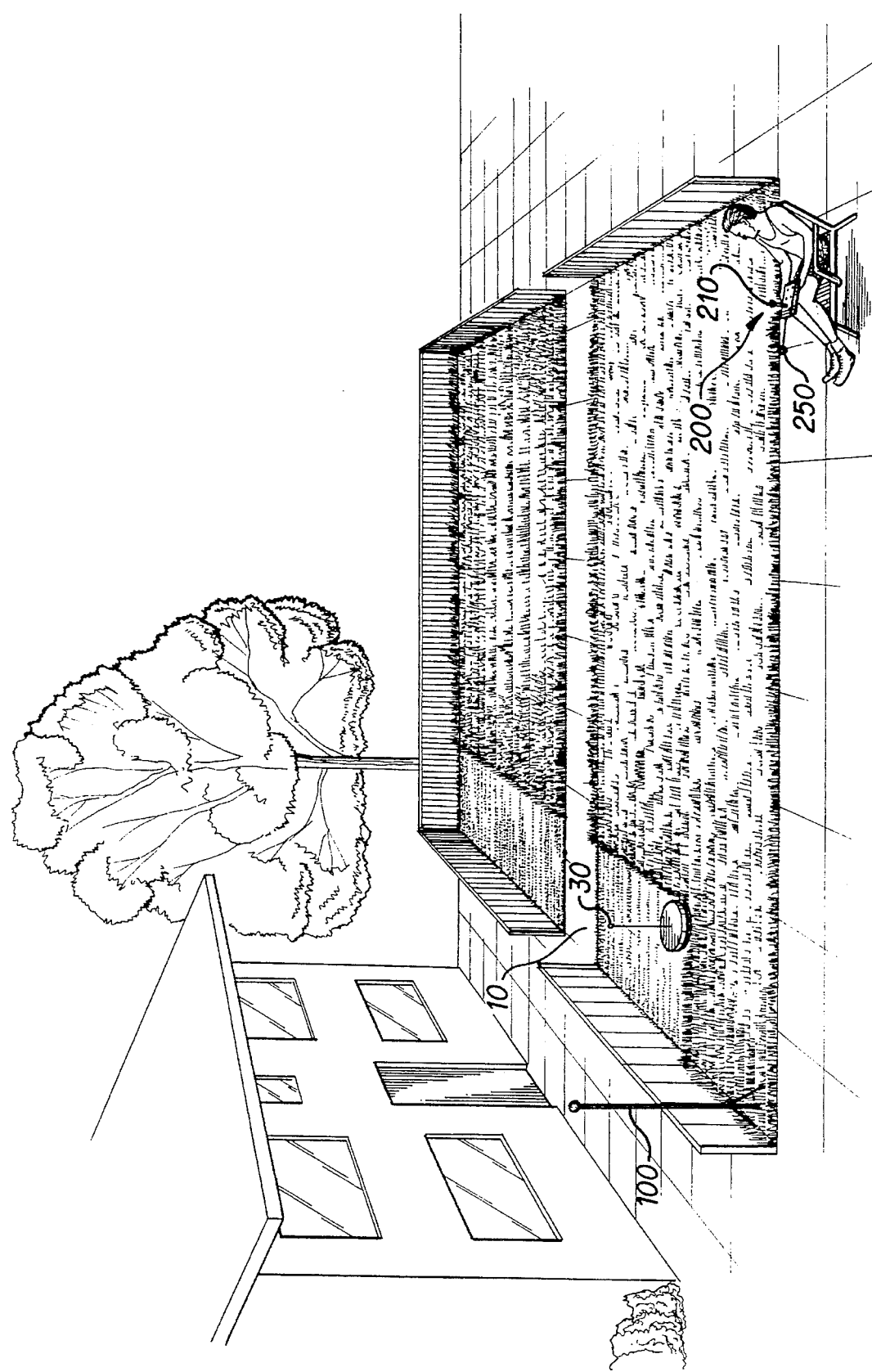
FIG. 1 is an environmental perspective view of the device in operation in a typical setting and illustrating a mowed portion as might be accomplished in the manual mode of the invention.

The remote controlled guidance system of the present invention is generally designated in a typical environment in FIG. 1. The device comprises the following main parts; work vehicle 10, transponder/antenna unit 100, and controller joystick 200.

The work vehicle 10 is seen in the embodiment described herein is generally circular or ovoid in shape, though this by no means should be construed as a limitation. Vehicle 10 has an antenna 30, as is shown in FIG. 1, which allows radio communication with the vehicle 10 through both the joystick controller 200 and the transponder antenna unit 100 as will be hereinafter described. The rectangular mowed section shown in FIG. 1 is typical of the type of mowing pattern which might be obtained when the device is operated in the manual mode in forward and reverse using the joystick controller in a conventional manner. The device is also capable of operation in a semi-automatic mode which is described more fully hereafter.

Figure 3:
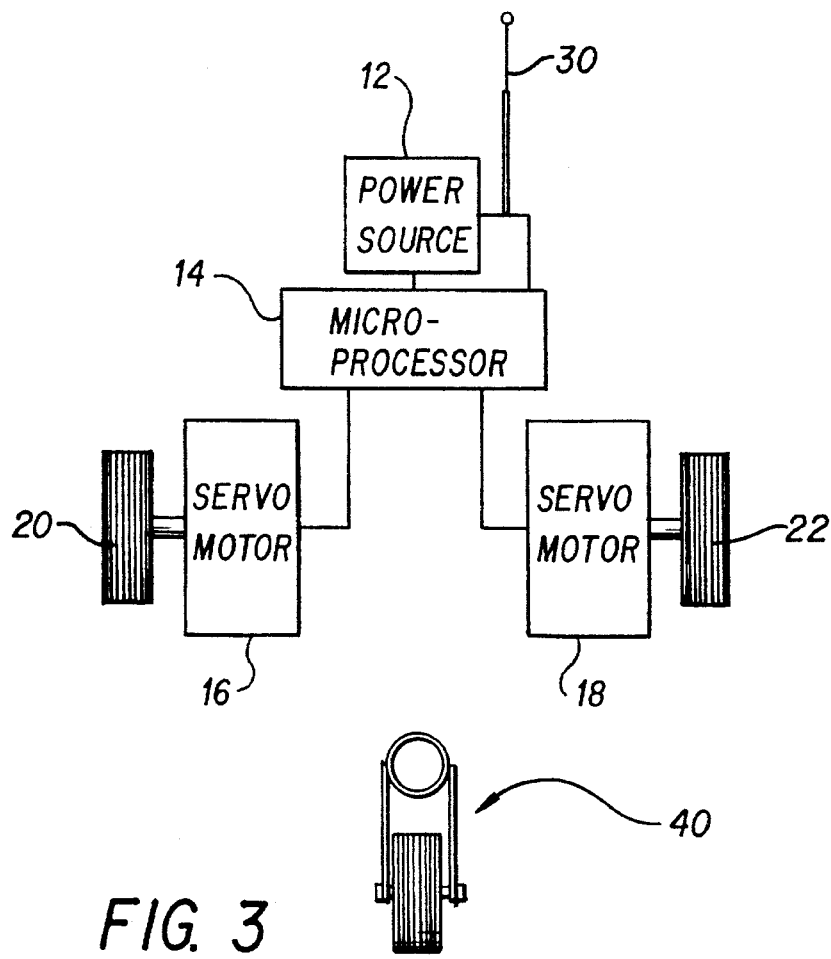
FIG. 3 is a schematic view of the vehicle showing the various systems as they relate to the control and powering of the two active wheels on a remotely guided vehicle.

Within the vehicle 10, as shown schematically in FIG. 3, is a power source 12, a microprocessor 14 and a pair of servomotors 16, 18. The first drive motor 16 controls the inner wheel 20 of the vehicle and the second drive motor 18 controls the outer wheel 22. These motors 16, 18 are familiar types of motors with variable drive speeds and are capable of driving the wheels 20, 22 in both directions. Also mounted on the bottom of the vehicle are stabilizer wheels 40, preferably of the free caster type. Though only one is shown here in FIG. 3, it would be obvious that any number of them could be employed and positioned in various ways to enhance the stability of the vehicle 10 as it moves about. The power source 12 can be a battery, a series of batteries, or a gas powered generator to provide electrical power. All these types of apparatus to deliver the required amounts of electrical power to the device are well known and it is not necessary to discuss them in detail. The batteries would preferably be rechargeable, if that was the type of power means chosen.

Figure 4:
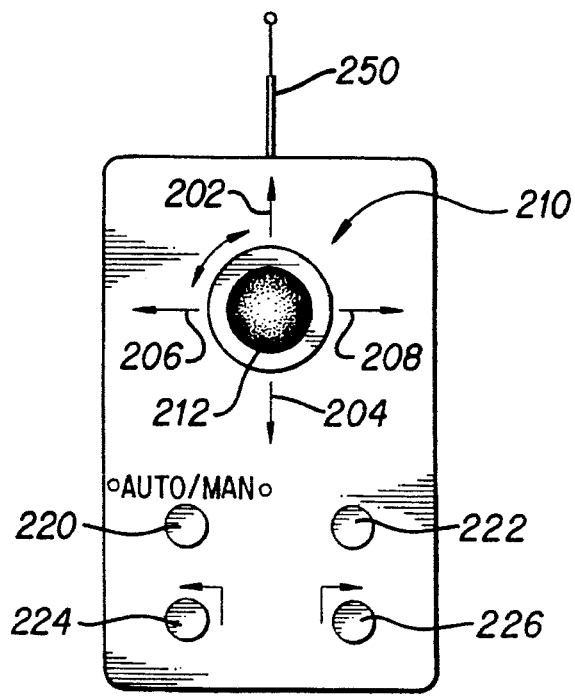
FIG. 4 is a top view of the handheld controller used in this invention.
Figure 5:
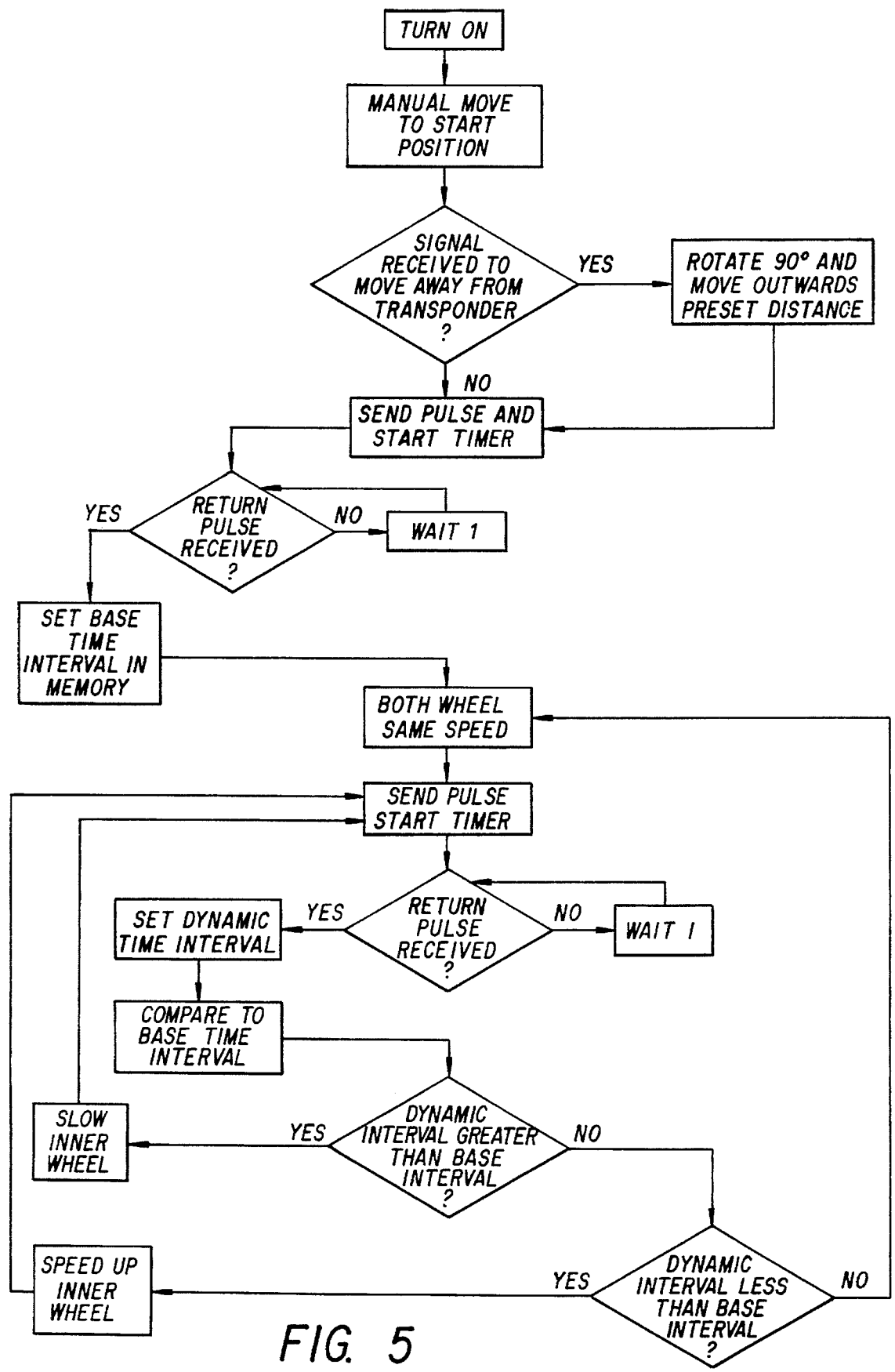
FIG. 5 is a flowchart delineating the steps taken during the manual and automatic operation of the unit.

The vehicle 10 can be manually manipulated from the controller/joystick 200. Referring to FIGS. 3 and 4, the controller 200 is seen to have on the face thereof a conventional joystick 210. The top surface of the controller 200 is additionally provided with directional arrows 202, 204, 206, 208. There are also four buttons or switches 220, 222, 224, 226. Switch 220 is arranged to toggle between automatic and manual modes. In the manual mode the position indicated at arrows 206 and 208 are deactivated and rotation of the knob or head of the joystick 212 in the directions indicated by arrow A1 incrementally speeds or slows a corresponding motor 16, 18 to turn the vehicle in the required direction. The joystick positions indicated at the directional arrows 202, 204 provide forward and backward movement of the vehicle 10. In addition to these features, if the vehicle is at rest the buttons 224 and 226 provide for turning the vehicle 90° to either the left or right. Appropriate indicia, as can be seen in FIG. 4, would be provided on the face of the controller 200. Thus, under manual control, the vehicle would be able to easily access any portion of the work area.

The communication between the controller 200 and the vehicle 10 as discussed above and is further discussed below takes place by means of radio transmission through the aerial 30 on the vehicle 10 and the antenna 250 on the controller 200. The aerial 30 is in turn connected to the microprocessor 14 which communicates with the drive motors 16, 18 for the wheels 20, 22. These arrangements are well known in the art, and are familiar in such fields as radio controlled racing cars, planes and the like. Thus, it is not necessary to discuss the arrangements in detail.

Figure 2:
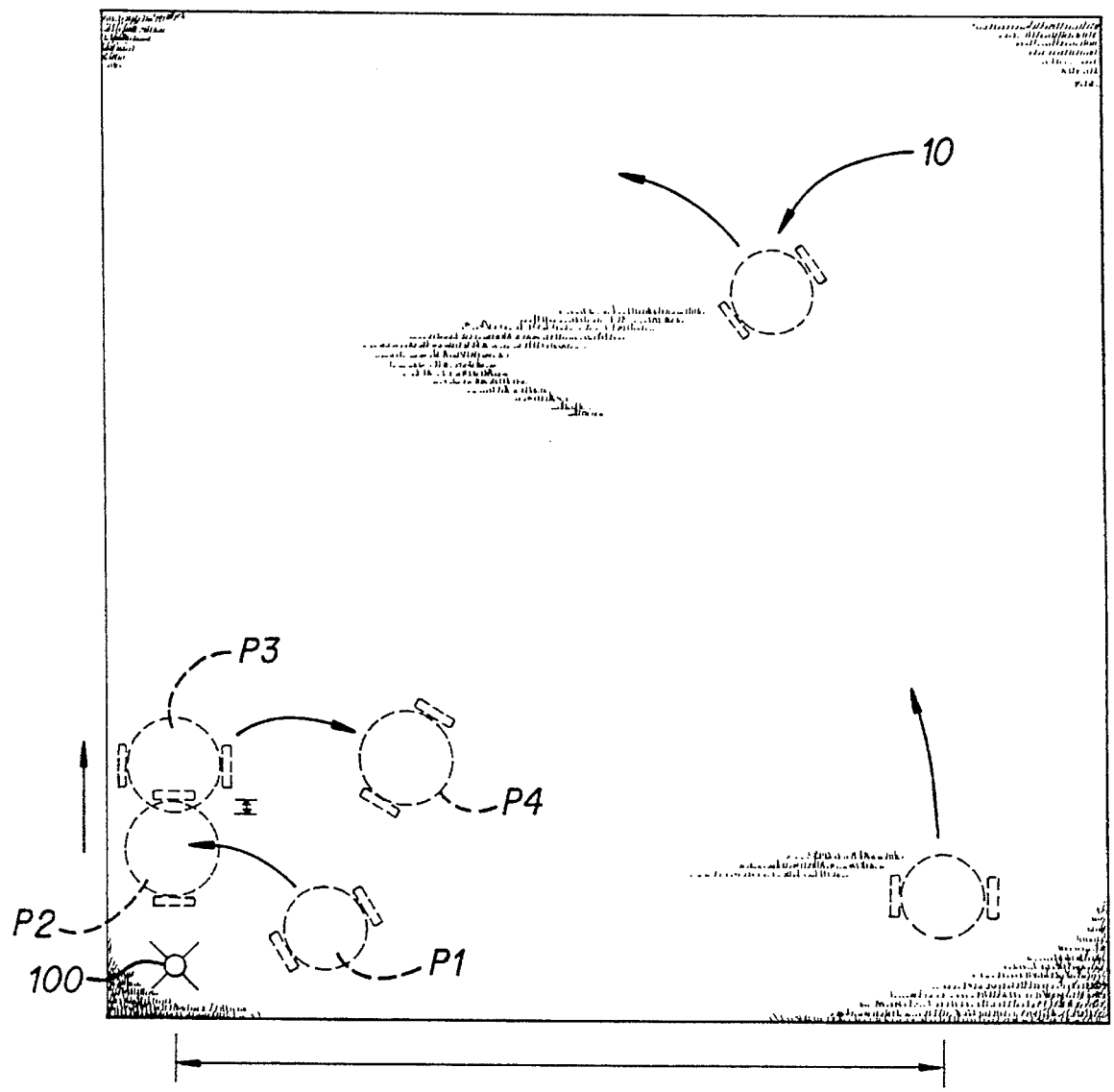
FIG. 2 is a top view showing the path of the work vehicle as it moves through a work area in the manner accomplished in the semiautomatic mode of the invention.

The discussion now turns to the automatic mode of operation of the device. This, as mentioned above, is toggled off and on by the depressing of switch 220. The vehicle 10 is maneuvered into the proper position in relation to the transponder antenna 100, as can be seen in FIG. 2 and is indicated in the phantom line showing as P1. It is important that the inner wheel 20 of the vehicle 10 is positioned closest to the transponder antenna 100 as will be discussed below. The vehicle 10 may have an indicia or a mark placed on it that conveniently indicates the side of the device that the inner wheel 20 is mounted on.

At this point, the button indicated at 222 in FIG. 4 is pressed which sends a signal to the microprocessor 14 on the vehicle 10 to send a preliminary timing pulse to the transponder antenna 100 and, simultaneously with that action, start a timer. This timing pulse induces a return pulse back to the vehicle 10, through the antenna 30, to the processor 14, which then takes the value of the timing counter (not shown) and puts it into RAM (random access memory). It should be noted that the timing pulse could be either of a RF type or of an ultrasonic type of signal. In the RF signal, the timing counter would have to be incremented in very small amounts, nanoseconds, for example, whereas in an ultrasonic type signal, the timing increment would be in milliseconds to provide for the proper degree of accuracy in the determining of the distance between the vehicle 10 and the transponder 100.

When the user now moves the joystick 210 into the position marked by directional arrow 206 and maintains it in that position, a signal goes forth from the processor 14 to both the drive motors 16, 18 to turn the wheels 20, 22 so that the vehicle 10 is propelled forwardly; i.e. both the wheels 20, 22 are turned in the same direction and at the same speed. At predetermined intervals as the vehicle moves, preferably several times a second, a second pulse is transmitted from the vehicle 10 to the transponder 100 and, at the same time, a second timer counter is activated. As above, this induces the transponder 100, when the signal is received, to transmit a return signal to the vehicle 10. When the return signal is received, the current value of the second timing counter is dumped into RAM and then is compared to the original timing counter value taken before the vehicle 10 began its movement. If the second signal timer value is greater than the original timer value, thus indicating that the vehicle 10 has moved farther away from the transponder 100 than at the start, the processor 14 would signal the drive motor 16 to drive the inner wheel 20 more slowly, thus turning the vehicle 10 more towards the transponder 100. In the event that the second timing counter value is less than the original, indicating that the vehicle 10 is closer than the base distance, the processor 14 would signal the drive motor 16 to impel the inner wheel 20 at a greater rate to turn the vehicle 10 outwardly from the transponder 100.

These increments of increases and decreases in the speed of inner wheel 20 would be of a sufficiently small nature that no radical "zigzagging" would be apparent while the vehicle 10 traversed the work swath. The smoothness of motion would also be enhanced by virtue of the secondary timing signals being sent, received in turn, and the resulting value compared a number of times a second. This constitutes what is known as a steering by driving means. In other words the wheels are driven at such a speed to so as to steer the vehicle in an arc of constant radius about transponder 100.

When the work vehicle 10 has reached the position shown in shadowed lines and indicated at P2 in FIG. 2 (which indicates one hypothetical end of a first work swath), the user signals the vehicle 10 to stop by releasing the joystick 210 from the position 206 and letting it come into the upright, at rest, position. At this point, the user moves the joystick into the position that is indicated by the directional arrow 202. This signals the vehicle 10 that it needs to position itself for a next work swath and reset the base timing counter for that swath. Pre-programmed into the processor 14 is a knowledge of the vehicle's powered wheelbase distance and the vehicle length. Thus, on receipt of this signal, the vehicle, by means of rotating one wheel in one direction and the other in the opposite direction, rotates itself 90°, and then moves a preset distance away from the transponder 100 to the position shown in shadowed lines in FIG. 2 and indicated at P3. This distance, it is contemplated, would be the length of the vehicle 10, less approximately 10% of that length. This could be varied by a slider or thumbwheel (not shown) mounted on the vehicle 10 if desired.

After the vehicle 10 has moved the predetermined distance outward from the transponder 100 (or inwards, as will be discussed further below), a new base timing counter value is set in the same way as discussed above, and the vehicle 10, in the meantime, rotates itself 90° once again. By using the opposite wheel rotation of that of the first 90° rotation, it is ensured that the inner wheel 20 is maintained in the proper position nearest the transponder 100. The user now moves joystick 210 into the position indicated by directional arrow 208 and the vehicle 10 continues through the second work swath while maintaining the proper distance from the transponder 100 through the same means as discussed above, but now comparing the secondary timing counters to the updated base timing counter and altering the speed of the inner wheel 20 accordingly. The vehicle 10 is shown in FIG. 2 partially through the second work swath in shadow lines indicated at P4. Thus it can be seen that the user is free to move around the work area while the vehicle does the job, whatever that may be.

It should be noted that the vehicle 10 need not start in a position as it is described here; i.e. adjacent to the transponder 100. The vehicle could be started at a distance and worked in closer to the transponder by using the joystick position indicated by the directional arrow 204 instead of the position indicated at 202. This would indicate that at the end of the work swath, and after the initial 90° rotation, that the vehicle 10 would be propelled in the opposite direction from that indicated by position 202, thus bringing the vehicle closer to the transponder 100 before the resetting of the base time counter interval.

The present invention is thus seen to provide an improvement over prior art devices, especially for working large areas that are relatively clear of obstructions. Obstructions are easily taken in hand by toggling from the automatic to manual mode, repositioning the vehicle 10 around the obstruction and simply resetting the base timer counter value.

It is to be understood that the provided illustrative examples are by no means exhaustive of the many possible uses for my invention. Grass cutting (as shown in the illustrations, especially FIG. 1) would be but one application of the system. Smoothing ice rinks without the need for a driver would be another. Other applications such as cleaning parking lots or the like would occur to a skilled practitioner.

From the foregoing description, one skilled in the art can easily ascertain the essential characteristics of this invention and, without departing from the spirit and scope thereof, can make various changes and modifications of the invention to adapt it to various usages and conditions. For example, the artisan could easily ascertain how to preprogram the microprocessor with the appropriate trigonometric functions so as to change the preprogrammed path. For example, one could adjust the relative wheel speeds, based on the transponder distance, so as to cause the vehicle to automatically follow a spiral of constantly increasing or decreasing radius of curvature or even to follow straight lines.

It is to be understood that the present invention is not limited to the sole embodiment described above, but encompasses any and all embodiments within the scope of the following claims:

I claim:

1. An apparatus for remote guidance of a mobile device in a semiautomatic or manual mode comprising;

a movable transponder capable of emitting electromagnetic signals and which is fixed in position during use;

a handheld controller including means to switch between said semiautomatic and said manual modes;

a vehicle having drive wheels comprising;

drive wheels;

drive means for both driving said drive wheels and steering said vehicle by driving said drive wheels at differing speeds;

distance sensing means for determining the instantaneous distance between said vehicle and said transponder; and automatic drive control means in response to the handheld controller for controlling said drive means to cause said vehicle to travel a predetermined path with respect to said transponder.

2. The apparatus of claim 1, wherein said predetermined path is a circular arc centered at said fixed transponder position and said automatic drive control means acts so as to maintain said distance between said vehicle and said transponder at a constant value during motion of said vehicle.

3. The apparatus of claim 2, wherein said distance sensing means comprises;

signal generation means for triggering a return pulse from said transponder, means for receiving said return pulse, means for timing the interval between said signal generation and reception of said return pulse and generating a time interval value, wherein said distance is determined by predetermined knowledge of signal propagation velocities and said time interval value.

4. The apparatus of claim 3, wherein said automatic drive control means comprises;

means for storing said time interval value, comparison means for comparing said time interval value with subsequently stored time interval values and generating a comparison signal, and means for controlling said drive wheels based upon said comparison signal.

5. The apparatus of claim 4, wherein said time interval values are updated many times per second so as to provide said comparison signal in a substantially continuous manner.

6. A method of controlling a work vehicle, said work vehicle including independently driven wheels to provide a steering by driving means comprising the steps of:

positioning the work vehicle at a distance from a transponder;

generating a signal from said vehicle to induce a return signal from said transponder;

timing the interval between the signal generation and the reception of the induced transponder signal;

storing the value of the interval thus timed;

moving the vehicle through equal speed driving of said independent wheels;

generating a signal to induce a return signal from said transponder;

timing the interval between the signal generation and the reception of the induced transponder signal, this being a dynamic interval value;

comparing the stored interval value to said dynamic interval value;

altering the speed of one of said wheels in accordance with the difference between said stored value and said dynamic value; whereby said vehicle moves in a generally smooth arc about said transponder, maintaining the distance set in the positioning step.

* * * * *